United States Patent [19]
Pickeral

[11] Patent Number: 5,901,207
[45] Date of Patent: * May 4, 1999

[54] SYSTEM AND METHOD FOR CHARGE NUMBER/CALLING PARTY NUMBER SWITCH CALL PROCESSING

[75] Inventor: Eddie Lee Pickeral, Plano, Tex.

[73] Assignee: MCI Communications Corporation, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/723,747

[22] Filed: Sep. 30, 1996

[51] Int. Cl.$^6$ .................................................. H04M 15/00
[52] U.S. Cl. .......................... 379/127; 379/142; 379/245
[58] Field of Search ................................. 379/127, 130, 379/134, 142, 118, 120, 121, 140, 183, 191, 193, 196, 197, 199, 200, 201, 204, 206, 207, 229, 230, 245

[56] References Cited

U.S. PATENT DOCUMENTS

| | | | |
|---|---|---|---|
| 4,922,490 | 5/1990 | Blakley | 379/142 |
| 5,018,191 | 5/1991 | Catron et al. | 379/207 |
| 5,023,904 | 6/1991 | Kaplan | 379/142 |
| 5,163,087 | 11/1992 | Kaplan | 379/142 |
| 5,420,916 | 5/1995 | Sekiguchi | 379/229 |
| 5,422,943 | 6/1995 | Cooney et al. | 379/229 |
| 5,455,827 | 10/1995 | Krause et al. | 379/229 |
| 5,530,741 | 6/1996 | Rubin | 379/127 |
| 5,533,106 | 7/1996 | Blumhardt | 379/127 |
| 5,586,177 | 12/1996 | Farris et al. | 379/229 |

*Primary Examiner*—Curtis A. Kuntz
*Assistant Examiner*—Binh K. Tieu

[57] ABSTRACT

A system and method for permitting the switches of a telecommunications network to process a call and deliver Automatic Number Identification information elements of Charge Number, Calling Party Number, and Presentation Indicator across the network. Upon receipt of a call from an origination trunk group, the origination switch creates an appropriate message based upon the termination trunk group type, the Presentation Indicator set by the originating party for that particular call, and the delivery option selected by the receiving party on a subscription basis. Then the message containing the proper Automatic Number Identification information is transported to the destination switch for eventual Caller ID delivery to the receiving party.

18 Claims, 8 Drawing Sheets

SYSTEM AND METHOD FOR CHARGE NUMBER/CALLING PARTY NUMBER SWITCH CALL PROCESSING

BACKGROUND OF THE INVENTION

1. Field of the Invention

This invention relates generally to telecommunications and more specifically, to switches of a telecommunications network that transport and process the Charge Number, Calling Party Number, and Presentation Indicator elements of Automatic Number Identification information to deliver Caller ID information across the network.

2. Related Art

Figure 1:
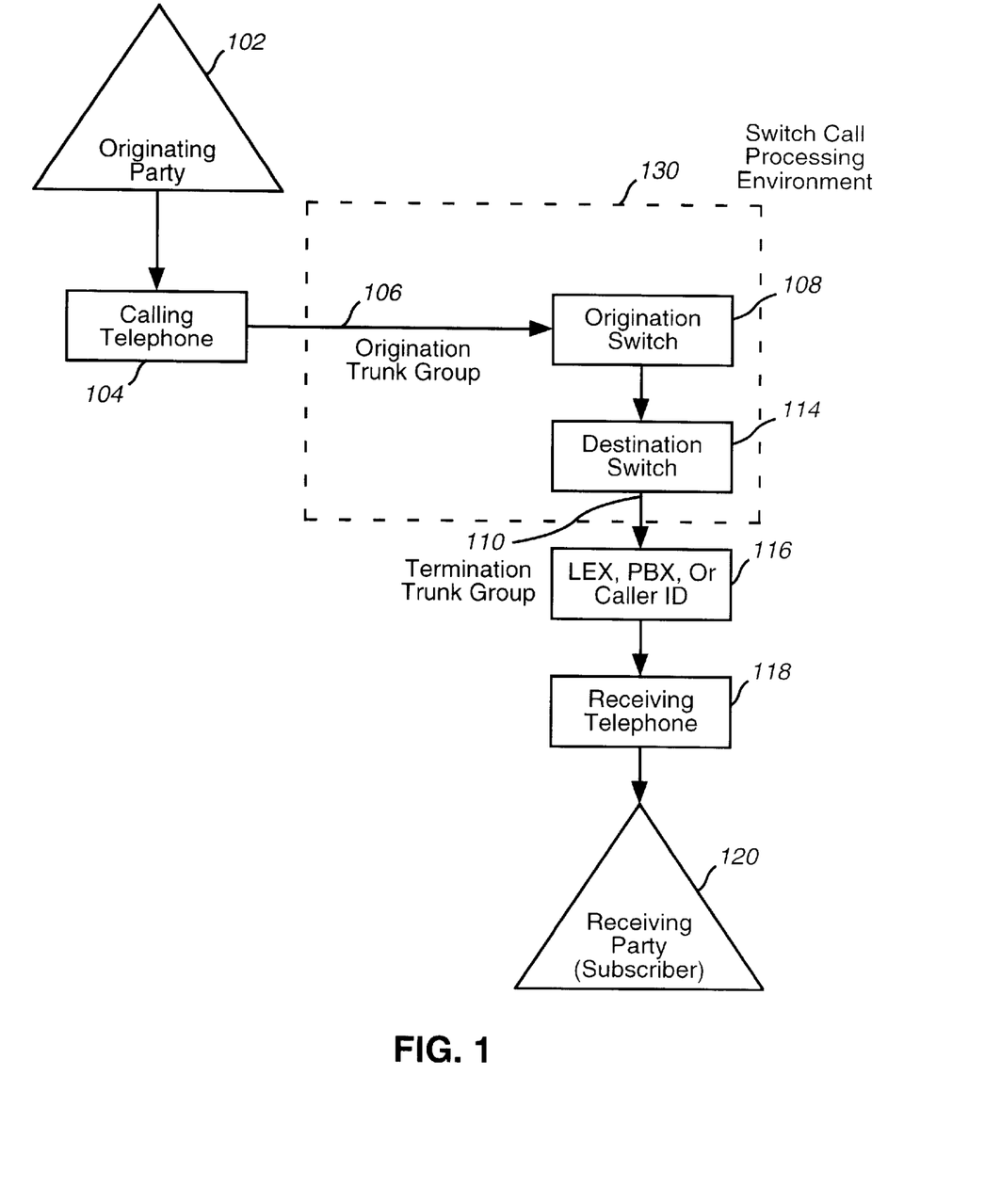
FIG. 1. is a block diagram of a conventional telecommunications environment.

A typical telecommunications network comprises multiple telecommunication switches located throughout a geographical area. FIG. 1 illustrates such a typical telecommunications environment. An originating party 102 utilizes a telephone 104 to place a call. The call is routed to an origination switch 108 on a transmission line referred to as the originating trunk. The originating trunk is one of many transmission lines coming into the origination switch 108 from the same geographical location as the telephone 104. These transmission lines including the originating trunk is referred to as an origination trunk group 106. After processing an incoming call, the switch transmits the call to a destination switch 114. The call is transmitted over a transmission line (referred to as the intermatching trunk) to the destination switch 114. Similar to the originating trunk, a terminating trunk 110 is one of a group of trunks connecting the destination switch 114 to a local exchange carrier (LEC), public branch exchange (PBX) or a caller identification (ID) box 116, which is, in turn, connected to a receiving telephone 118. Thus the Caller ID information is available before the first ring and a receiving party 120 can know the telephone number of the originating party 102 before actually picking up the telephone receiver to answer the incoming call.

At times, the originating party 102 may not want the receiving party to have the Caller ID information for privacy reasons. Therefore the origination switch 108 must transport a Presentation Indicator (PI) across the network to the destination switch 114. The PI indicates whether the originating party's 120 telephone number may be presented, via Caller ID, to the receiving party 120 ("Address Presentation Allowed") or must remain private ("Address Presentation Restricted"). The PI is defaulted to the "Address Presentation Allowed" setting, but may be set to "Address Presentation Restricted" by the originating party 102 before placing the call. This is usually done by dialing a certain prefix (e.g., "*67") before placing the call.

Automatic Number Identification (ANI) information is encoded on every incoming call, which box 116 can decipher. ANI information is comprised of the Calling Party Number (CgPN) parameter, the Charge Number (ChgN) parameter, and PI information. The CgPN is the information that identifies the number of the originating party and the ChgN is the actual telephone number charged for that particular phone call. In normal home dialing, these two parameters are identical. However, when dealing with a Private Branch Exchange (PBX (i.e., several business lines in a building), the ChgN may be the owner of the services, and thus not the same as the CgPN who is the subscriber of the services behind the PBX.

There are many switch and trunk group types, each having their own configurations and protocols with different message formats for transmitting switch signaling and voice data. Types include: (a) Signaling System Seven/Integrated Services Digital Network User Part (SS7/ISUP) which is a phone out-of-band signaling protocol system that allows a greater bandwidth by separating the phone signaling (supervising, alerting, and addressing functions) and voice data; (b) Integrated Services Digital Network/ Primary Rate Interface (ISDN/PRI), which is an out-of-band 1,544,000 bits/sec network that combines voice, data, signaling, etc., and operates on a T-1 line; and (c) Per Trunk Signaling (PTS) Inband which is a tone signaling system that passes within the same band as voice data. The origination trunk group 106 and termination trunk group 110 may be the same or different trunk types, thus effecting Caller ID delivery.

The different protocols for the above mentioned trunk group types are well known in the art. For example, the SS7/ISUP trunk type uses an Initial Address Message (IAM) to send the ChgN, CgPN, and the PI as parameters in the message from the origination switch 108 to the termination switch 114. The format of this message is defined in American National Standards Institute, Inc. (ANSI) ISUP Issue 1, T1.113-1988 (which is incorporated herein by reference). A typical IAM format is shown below in Table 1:

TABLE 1

| Parameter | Type | Length |
| --- | --- | --- |
| Message Type | F | 1 |
| Nature of Connection Indicators | F | 1 |
| Forward Call Indicators | F | 2 |
| Calling Party's Category | F | 1 |
| User Service Information | V | 3–n |
| Called Party Number | V | 2–11 |
| Access Transport | O | 3–n |
| Business Group | O | 9–n |
| Call Reference | O | 8 |
| Calling Party Number | O | 5–12 |
| Charge Number | O | 3–14 |
| Circuit Assignment Map | O | 6 |
| Generic Address | O | 6–13 |
| Generic Digits | O | 4–n |
| Forward Call Special Information | O | 3 |
| Multiple Business Group | O | 9 |
| Network Specific Facility | O | 3–n |
| Operator Information | O | 9–n |
| Software Indicator | O | 3 |
| Supplementary Line Information | O | 3–n |
| Network Transport | O | 5–n |
| Originating Line Information | O | 3 |
| Redirection Information | O | 3–4 |
| Transit Network Selection | O | 5–6 |

A typical CgPN parameter, which includes the Presentation Indicator as a subparameter, format is shown below in Table 2:

TABLE 2

| Byte | 7 | 6 | 5 | 4 | 3 | 2 | 1 | 0 |
| --- | --- | --- | --- | --- | --- | --- | --- | --- |
| 1 | Parity | | Nature of Address Indicator | | | | | |
| 2 | Spare | | Numbering Plan | | | PI | | SCREENING |
| 3 | | | D2 | | | D1 | | |
| 4 | | | D4 | | | D3 | | |
| : | | | : | | | : | | |
| n-1 | | | D(m-2) | | | D(m-3) | | |
| n | | | Dm (or filler) | | | D(m-1) | | |

The CgPN parameter includes some of the following data elements:

Parity—This field is a parity indicator which shall be coded as follows:

| | |
|---|---|
| 0 | Even number of Dm digits; |
| 1 | Odd number of Dm digits; |

Nature of Address Indicator—this field defines the type of data identifying the call originator;

PI—the Address Presentation Restricted Indicator specifies whether the originating address may be disclosed or must be kept confidential. Coding is as follows:

| | |
|---|---|
| 00 | Address presentation allowed (default); |
| 01 | Address presentation restricted; |
| 10 | Address unavailable due to interworking; |
| 11 | Spare/Reserved; |

D1 to Dm—These subfields are digits representing the value of the calling party number type specified in the indicator field. Each digit (0 to 9) occupies 4 bits, encoded in BCD format.

The typical Charge Number Parameter format is shown below in Table 3:

TABLE 3

| Byte | 7 | 6 | 5 | 4 | 3 | 2 | 1 | 0 |
|---|---|---|---|---|---|---|---|---|
| 1 | Parity | Nature of Address Indicator | | | | | | |
| 2 | Spare | Numbering Plan | | | Reserved | | | |
| 3 | D2 | | | | D1 | | | |
| 4 | D4 | | | | D3 | | | |
| : | : | | | | : | | | |
| n-1 | D(m-2) | | | | D(m-3) | | | |
| n | Dm (or filler) | | | | D(m-1) | | | |

Similarly, the ISDN/PRI trunk group type uses a SETUP message containing the appropriate data elements to delivery ANI information. Also, PTS/Inband trunk types implement a variety of protocols to delivery of ANI information. These vary according to manufacturer and are also well known in the art.

Current implementations for Caller ID delivery map the ChgN parameter to the CgPN parameter and deliver that information to the receiving party 120 as the CgPN. This mapping is done at the origination switch 108 and thus limits the information available at the destination switch 114 and consequently to the receiving party 120.

The Federal Communications Commission (FCC) has recently required that Local Exchange Carriers (LECs) (i.e., local telephone service companies) and Interexchange Carriers (IXCs) (i.e., long distance telephone service companies) to transmit the CgPN and honor the PI, where the information is available, for all SS7/ISUP calls. Therefore there is a need to comply with these orders but still provide the ability to map the ChgN to the CgPN. Furthermore, there is a need, to allow different telephone subscribers to choose different Caller ID delivery options based on the data available, the PI, and the origination/ termination trunk group types without impacting current implementations for billing and switch call processing.

SUMMARY OF THE INVENTION

The present invention is directed to a system and method for transporting the Calling Party Number, Charge Number, and Presentation Indicator elements of Automatic Number Identification across a telecommunications network. The system receives a Presentation Indicator along with a Charge Number and/or Calling Party number from an origination trunk group. The Presentation Indicator is set by the originating (calling) party at the origination trunk group. The availability of the Charge Number and/or the Calling Party Number is a function of the type of origination trunk group. A message is then formatted according to the specific type of termination trunk group, the Presentation Indicator set by the originating party, and the termination trunk group parameter delivery options selected by the receiving party (subscriber). Thus, Caller ID information can be delivered to the receiving party in their subscribed format.

The present invention maintains the flexibility to map the Charge Number to the Calling Party Number and adds additional flexibility when delivering Calling Party Number and Charge Number information to the termination trunk group. This flexibility includes allowing the termination trunk subscriber to selectively honor or ignore the Presentation Indicator, providing conditional Charge Number delivery, and providing conditional Calling Party Number delivery. New parameters added to the termination trunk group screening tables allow the present invention to provide the delivery option functionality. The system and the corresponding method performs the above without any impact to telephone call billing systems or any other switch call processing and complies with current FCC orders to deliver the Calling Party Number and honor the Presentation Indicator on SS7/ISUP calls when available.

Further features and advantages of the invention, as well as the structure and operation of various embodiments of the invention, are described in detail below with reference to the accompanying diagrams.

BRIEF DESCRIPTION OF THE FIGURES

The present invention will be described with reference to the accompanying drawings, wherein.

DETAILED DESCRIPTION OF THE PREFERRED EMBODIMENTS

Overview

The present invention is directed to a system and method for enabling a telecommunications network to transport the Charge Number (ChgN) and Calling Party Number (CgPN) parameters of the Automatic Number Identification (ANI) information, when available, and the Presentation Indicator (PI) from an origination trunk group to a termination trunk group. The present invention allows for mapping of the ChgN to the CgPN at the termination trunk group and subscriber selected Caller ID delivery options. These termination trunk group options include: (a) Honor the PI for CgPN delivery; (b) Deliver the CgPN regardless of the PI; (c) Prevent CgPN delivery in all cases; (d) Conditional ChgN Delivery; and (e) Conditional CgPN Delivery. These options are stored in the destination switch 114 database. Furthermore the PI can be set to "Address Presentation Allowed" or "Address Presentation Restricted." The present invention's system and method for delivering Caller ID information based on the ANI parameters from the different trunk group types, the setting of the PI, and the subscriber delivery options is described herein.

Figure 2:
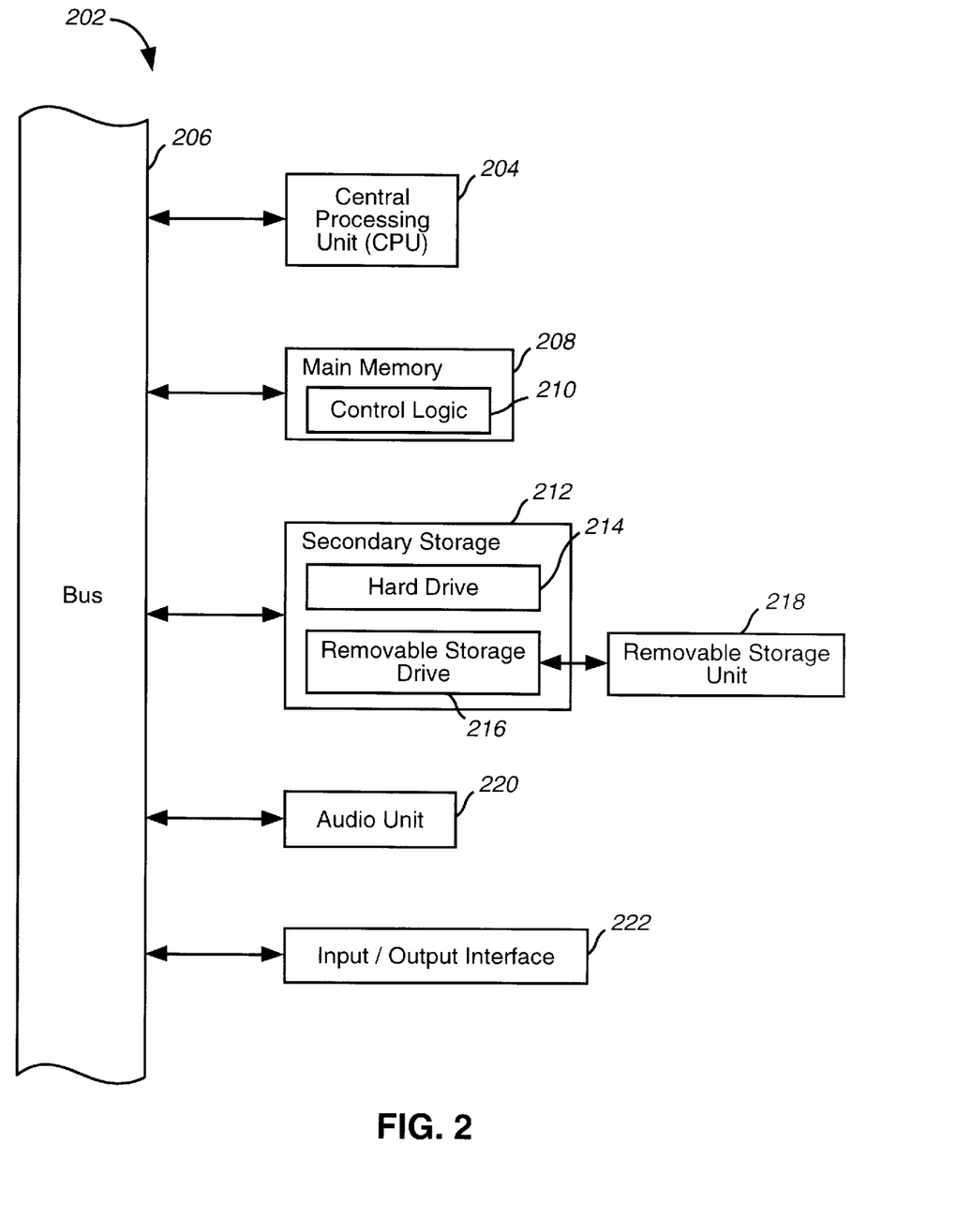
FIG. 2. is a block diagram of an exemplary computer system useful for implementing the present invention.

The chosen embodiment of the present invention is computer software executing within a computer system. FIG. 2 shows an exemplary computer system. The computer system 202 includes one or more processors, such as a processor 204. The processor 204 is connected to a communication bus 206.

The computer system 202 also includes a main memory 208, preferably random access memory (RAM, and a secondary memory 210. The secondary memory 210 includes, for example, a hard disk drive 214 and/or a removable storage drive 216, representing a floppy disk drive, a magnetic tape drive, a compact disk drive, etc. The removable storage drive 216 reads from and/or writes to a removable storage unit 218 in a well known manner.

Removable storage unit 218, also called a program storage device or a computer program product, represents a floppy disk magnetic tape, compact disk etc. The removable storage unit 218 includes a computer usable storage medium having stored therein computer software and/or data.

Computer programs (also called computer control logic) are stored in main memory 208 and/or the secondary memory 210. Such computer programs, when executed, enable the computer system 202 to perform the functions of the present invention as discussed herein. In particular, the computer programs, when executed, enable the processor 204 to perform the functions of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

Implementation of the Invention

Figure 3:
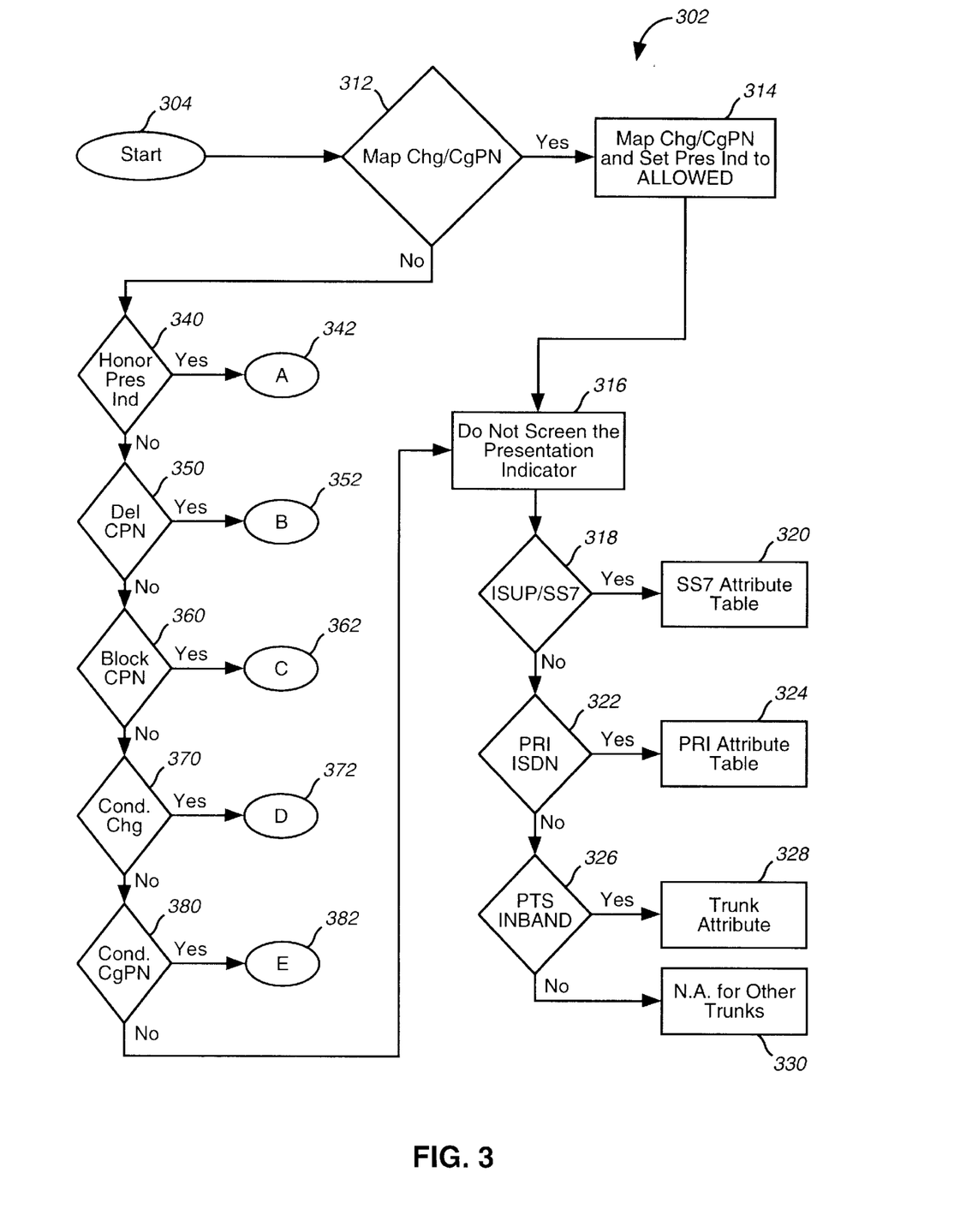
FIG. 3. is a flowchart representing the overall preferred operation of the present invention.

FIG. 3, is a switch call processor representing the overall preferred operation of the present invention within the switch call processing environment 130. Switch call processor 302 begins at step 304 with control passing immediately to step 312. In step 312 a screening table for the termination trunk group is referenced to determine the appropriate information the origination trunk group should place in its message to the termination trunk group. If the termination trunk group screening table indicates that mapping the ChgN to the CgPN should be done, as in conventional implementations, then step 314 is performed, which maps the ChgN to the CgPN, formulates a message (in an appropriate format for the termination trunk group 110 type) with the ChgN coded as the CgPN, sets the PI to "Address Presentation Allowed," and transports the message to the termination trunk group.

In step 316, the destination switch 114 does not screen the PI and then step 318 determines termination trunk group is a SS7/ISUP type. If so, step 320 is performed to consult the SS7/ISUP attribute table to gather information to complete the call and ANI delivery. If the termination trunk group is not a SS7/ISUP type, step 322 determines if the destination switch 114 is a PRI/ISDN type. If so, step 324 is performed to consult the PRI/ISDN attribute table to gather information to complete the call and ANI delivery. If the destination switch 114 is not a PRI/ISDN type, step 328 determines if the destination switch 114 is a PTS/Inband type. If so, step 328 is performed to consult the PTS/Inband attribute to gather information to complete the call and ANI delivery. If the destination switch 114 is not a PTS/Inband type, step 330 simply completes the call because ANI delivery is not applicable for trunk group types other than the ISUP/SS7, PRI/ISDN, or PTS/Inband types.

Referring again to step 312, if the termination trunk group screening table indicates that mapping the ChgN to the CgPN should not be done as in current implementations, then step 340 is performed, which determines if the termination trunk group parameter, set according to the receiving party 120 subscription selection, is set to an option A—"Honor the PI for CgPN delivery," according to the first option feature of the present invention. If so, step 342 is performed as described below. If the termination trunk group parameter is not set to delivery option A, step 350 determines if it is set to delivery option B—"Deliver the CgPN regardless of the PI," according to the second option feature of the present invention. If so, step 352 is performed as described below. If the termination trunk group parameter is not set to delivery option B, step 360 determines if it is set to delivery option C—"Prevent CAP delivery in all cases," according to the third option feature of the present invention. If so, step 362 is performed as described below. If the termination trunk parameter is not set to delivery option C, step 370 determines if it is set to delivery option D—"Conditional ChgN Delivery," according to the fourth option feature of the present invention. If so, step 372 is performed as described below. If the termination trunk group parameter is not set to option D, step 380 determines if it is set to E—"Conditional CgPN Delivery," according to the fifth option feature of the present invention. If so, step 382 is performed as described below. If step 380 determines that the termination trunk group parameter is not set to delivery option E, then none of the delivery options were selected and the switch will use existing processing beginning with step 316 and progressing as described above.

As stated previously, the formation of the message to be transported to the termination trunk group is dependent on the termination trunk group type. Similarly, the ANI information will depend on the delivery option selected by the receiving party 120 and the PI set by the originating party 102. Below is a description of the continuation of switch call processing for options A (step 342), B (step 352), C (step 362), D (step 372), and E (step 382) as illustrated by FIGS. 4, 5, 6, 7 and 8 respectively, in accordance with the present invention.

Option A—"Honor the PI for CgPN Delivery"

Figure 4:
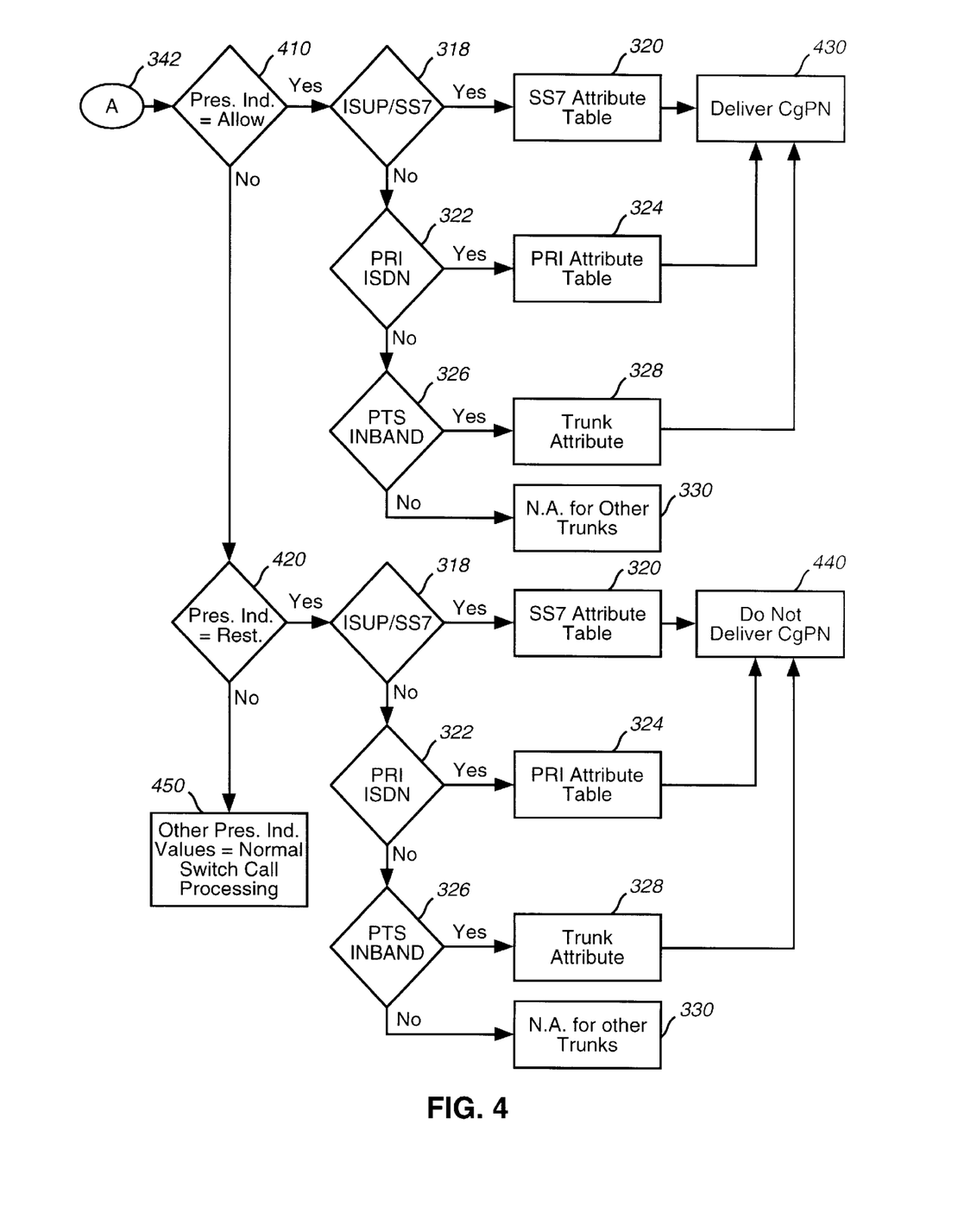
FIG. 4. is a flowchart representing the preferred operation of delivery option A of the present invention and is a continuation of FIG. 3.

The switch call processor 302, having determined at step 340 that delivery option A was selected by the receiving party 120 subscriber, proceeds to step 342. Referring to FIG. 4, step 342 passes control to step 410. Step 410 determines whether the originating party 102 set the PI to "Address Presentation Allowed." If so, step 318 determines if the termination trunk group is a SS7/ISUP type. If so, step 320 is performed to consult the SS7/ISUP attribute table to formulate an IAM (Initial Address Message) to the destination switch 114 with the CgPN parameter included as received by the origination switch 108. Then step 430 delivers the message to the destination switch 114. If the termination trunk group is not a SS7/ISUP type, step 322 determines if the destination switch 114 is a PRI/ISDN type. If so, step 324 is performed to consult the PRI/ISDN attribute table to formulate a SETUP message to the destination switch 114 with the CgPN included. Then step 430 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the CgPN included. Then step 430 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 410 determines the originating party 102 did not set the PI to "Address Presentation Allowed," step 420 determines if the PI is set to "Address Presentation Restricted." If so, switch call processor 302 again proceeds to step 318. Step 318 determines if the termination trunk group is a SS7/ISUP type. If so, step 320 is performed to consult the SS7/ISUP attribute table to formulate an IAM to the destination switch 114 with the CgPN parameter included as received by the origination switch 108 but with the Calling Party number itself (D1–Dm) excluded. See Table 2. Then step 440 delivers the message to the destination switch 114. If the termination trunk group is not a SS7/ISUP type, step 322 determines if the termination trunk group is a PRI/ISDN type. If so, step 324 is performed to consult the PRI/ISDN attribute table to formulate a SETUP message to the destination switch 114 with the CgPN parameter excluded. Then step 440 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the CgPN excluded. Then step 440 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 420 determines the originating party 102 did not set the PI to "Address Presentation Restricted," the switch call processor 302, in step 450, will formulate an IAM to the destination switch 114 with the CgPN parameter as received from the origination switch 108 for a SS7/ISUP termination trunk group type; formulate a SETUP message to the destination switch 114 with the appropriate Data Elements for a PRI/ISDN termination trunk group type; or follow the appropriate protocol for the termination trunk group type and generate a message with the ChgN included for a PTS/Inband termination trunk group type.

Option B—"Deliver the CgPN Regardless of the PI"

Figure 5:
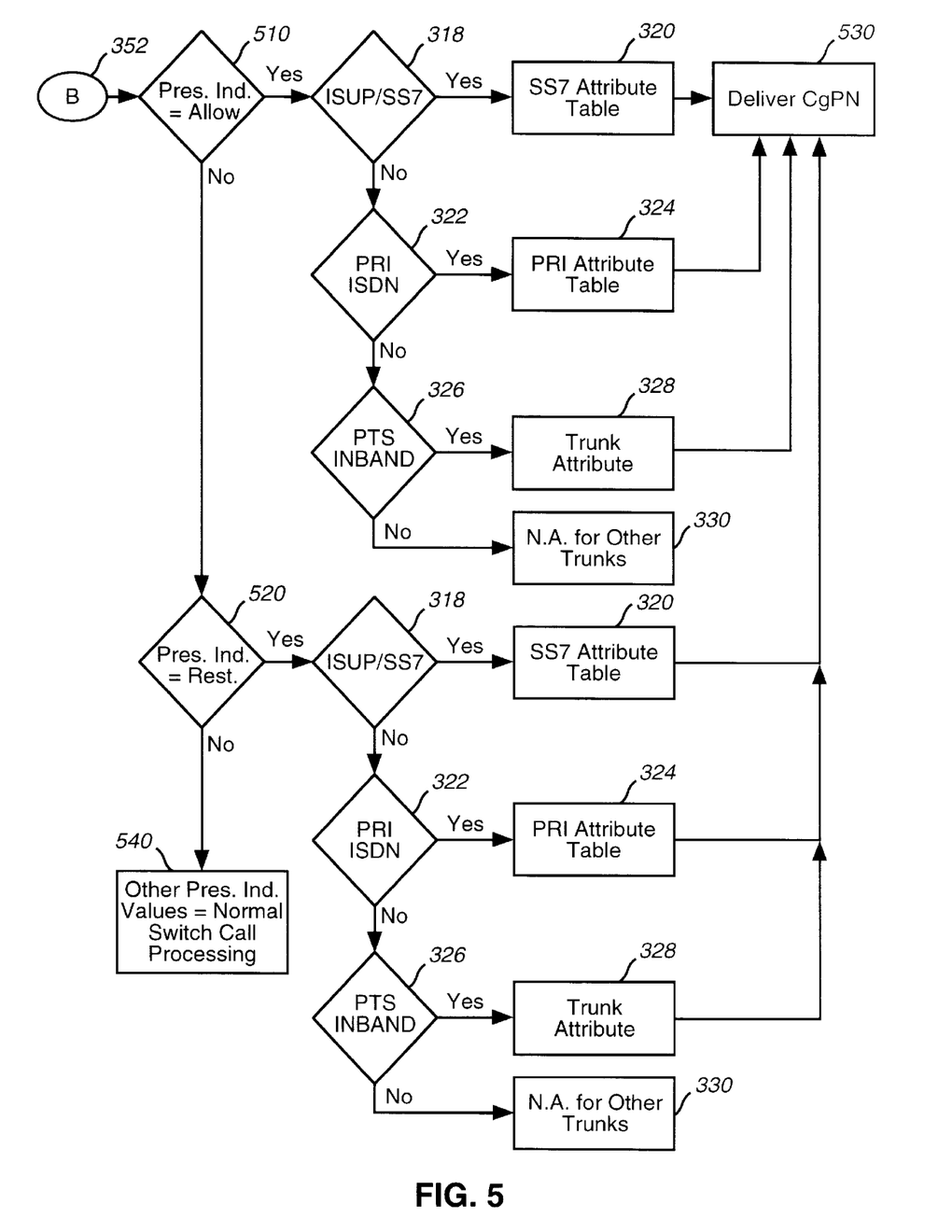
FIG. 5. is a flowchart representing the preferred operation of delivery option B of the present invention and is a continuation of FIG. 3.

The switch call processor 302, having determined at step 350 that delivery option B was selected by the receiving party 120 subscriber, proceeds to step 352. Referring to FIG. 5, step 352 passes control to step 510. Step 510 determines whether the originating party 102 set the PI to "Address Presentation Allowed." If so, step 318 determines if the termination trunk group is a SS7/ISUP type. If so, step 320 is performed to consult the SS7/ISUP attribute table to formulate an IAM to the destination switch 114 with the CgPN parameter included as received by the origination switch 108. Then step 430 delivers the message to the destination switch 114. If the termination trunk group is not a SS7/ISUP type, step 322 determines if the destination switch 114 is a PRI/ISDN type. If so, step 324 is performed to consult the PRI/ISDN attribute table to formulate a SETUP message to the destination switch 114 with the CgPN parameter included. Then step 430 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the CgPN included. Then step 430 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 510 determines the originating party 102 did not set the PI to "Address Presentation Allowed," step 520 determines if the PI is set to "Address Presentation Restricted." If so, switch call processor 302 again proceeds to step 318. Step 318 determines if the termination trunk group is a SS7/ISUP type. If so, step 320 is performed to consult the SS7/ISUP attribute table to formulate an IAM to the destination switch 114 with the CgPN parameter included (with the Calling Party Number itself (D1–Dm)) as received by the origination switch 108. Then step 430 delivers the message to the destination switch 114. If the termination trunk group is not a SS7/ISUP type, step 322 determines if the termination trunk group is a PRI/ISDN type. If so, step 324 is performed to consult the PRI/ISDN attribute table to formulate a SETUP message to the destination switch 114 with the CgPN parameter included. Then step 430 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the CgPN included. Then step 430 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 520 determines the originating party 102 did not set the PI to "Address Presentation Restricted," the switch call processor 302, in step 540, will formulate an IAM to the destination switch 114 with the CgPN parameter as received from the origination switch 108 for a SS7/ISUP termination trunk group type; formulate a SETUP message to the destination switch 114 with the appropriate Data Elements for a PRI/ISDN termination trunk group type; or follow the appropriate protocol for the termination trunk group type and generate a message with the ChgN included for a PTS/Inband termination trunk group type.

Option C—"Prevent CgPN Delivery"

Figure 6:
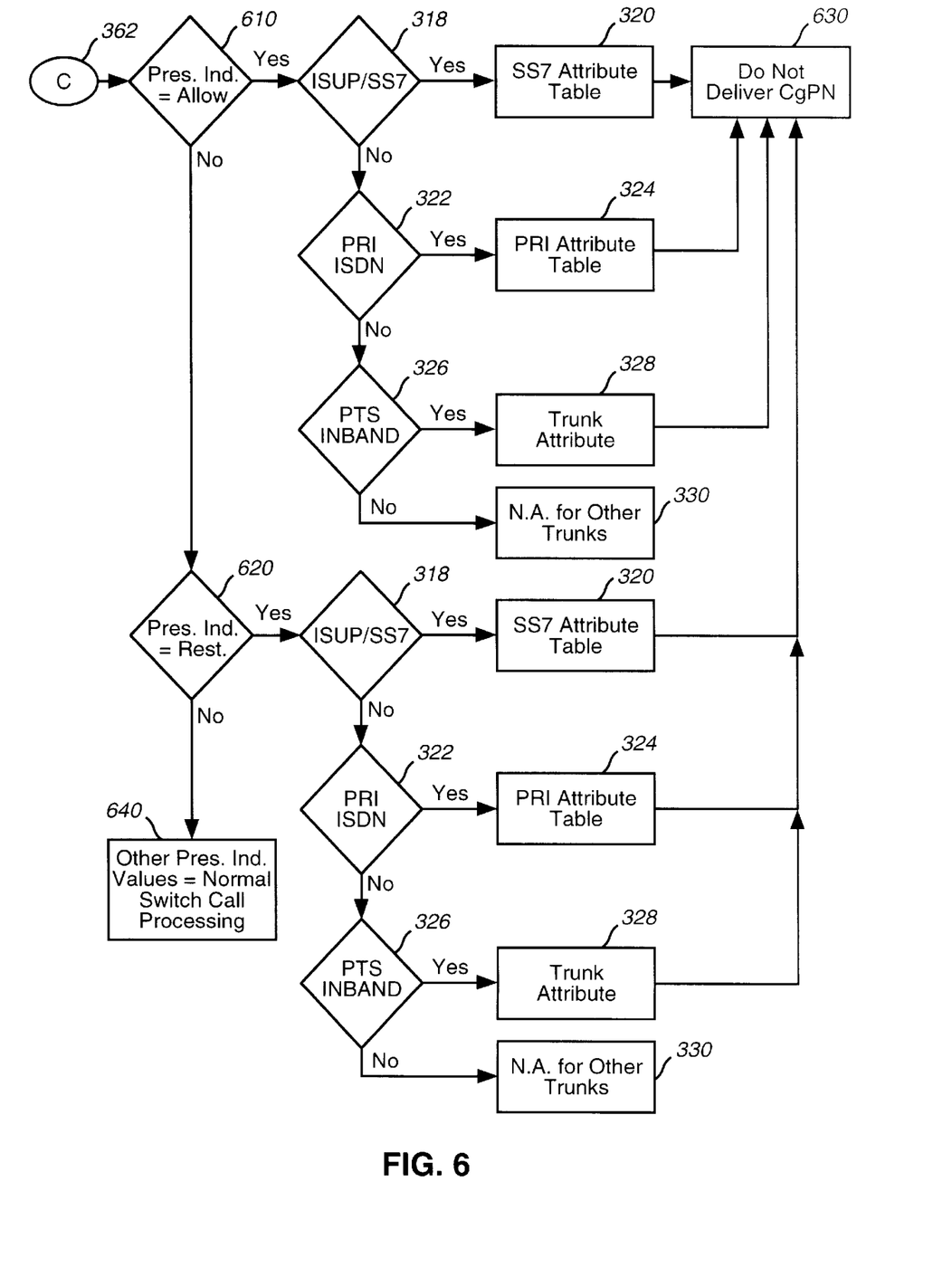
FIG. 6. is a flowchart representing the preferred operation of delivery option C of the present invention and is a continuation of FIG. 3.

The switch call processor 302, having determined at step 360 that delivery option C was selected by the receiving party 120 subscriber, proceeds to step 362. Referring to FIG. 6, step 362 passes control to step 610. Step 610 determines whether the originating party 102 set the PI to "Address Presentation Allowed." If so, step 318 determines if the termination trunk group is a SS7/ISUP type. If so, step 320 is performed to consult the SS7/ISUP attribute table to formulate an IAM to the destination switch 114 without the CgPN parameter included as received by the origination switch 108. Then step 440 delivers the message to the destination switch 114. If the termination trunk group is not a SS7/ISUP type, step 322 determines if the destination switch 114 is a PRI/ISDN type. If so, step 324 is performed to consult the PRI/ISDN attribute table to formulate a SETUP message to the destination switch 114 without the CgPN parameter included. Then step 440 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 without the CgPN included. Then step 440 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 610 determines the originating party 102 did not set the PI to "Address Presentation Allowed," step 620 determines if the PI is set to "Address Presentation Restricted." If so, switch call processor 302 again proceeds to step 318. Step 318 determines if the termination trunk group is a SS7/ISUP type. If so, step 320 is performed to consult the SS7/ISUP attribute table to formulate an IAM to the destination switch 114 without the CgPN parameter included. Then step 440 delivers the message to the destination switch 114. If the termination trunk group is not a SS7/ISUP type, step 322 determines if the termination trunk group is a PRI/ISDN type. If so, step 324 is performed to consult the PRI/ISDN attribute table to formulate a SETUP message to the destination switch 114 without the CgPN parameter included. Then step 440 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 without the CgPN included. Then step 440 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 620 determines the originating party 102 did not set the PI to "Address Presentation Restricted," the switch call processor 302, in step 640, will formulate an IAM to the destination switch 114 with the CgPN parameter as received from the origination switch 108 for a SS7/ISUP termination trunk group type; formulate a appropriate e to the destination switch 114 with the appropriate Data Elements for a PRI/ISDN termination trunk group type; or follow the appropriate protocol for the termination trunk group type and generate a message with the ChgN included for a PTS/Inband termination trunk group type.

Option D—"Conditional ChgN Delivery"

Figure 7:
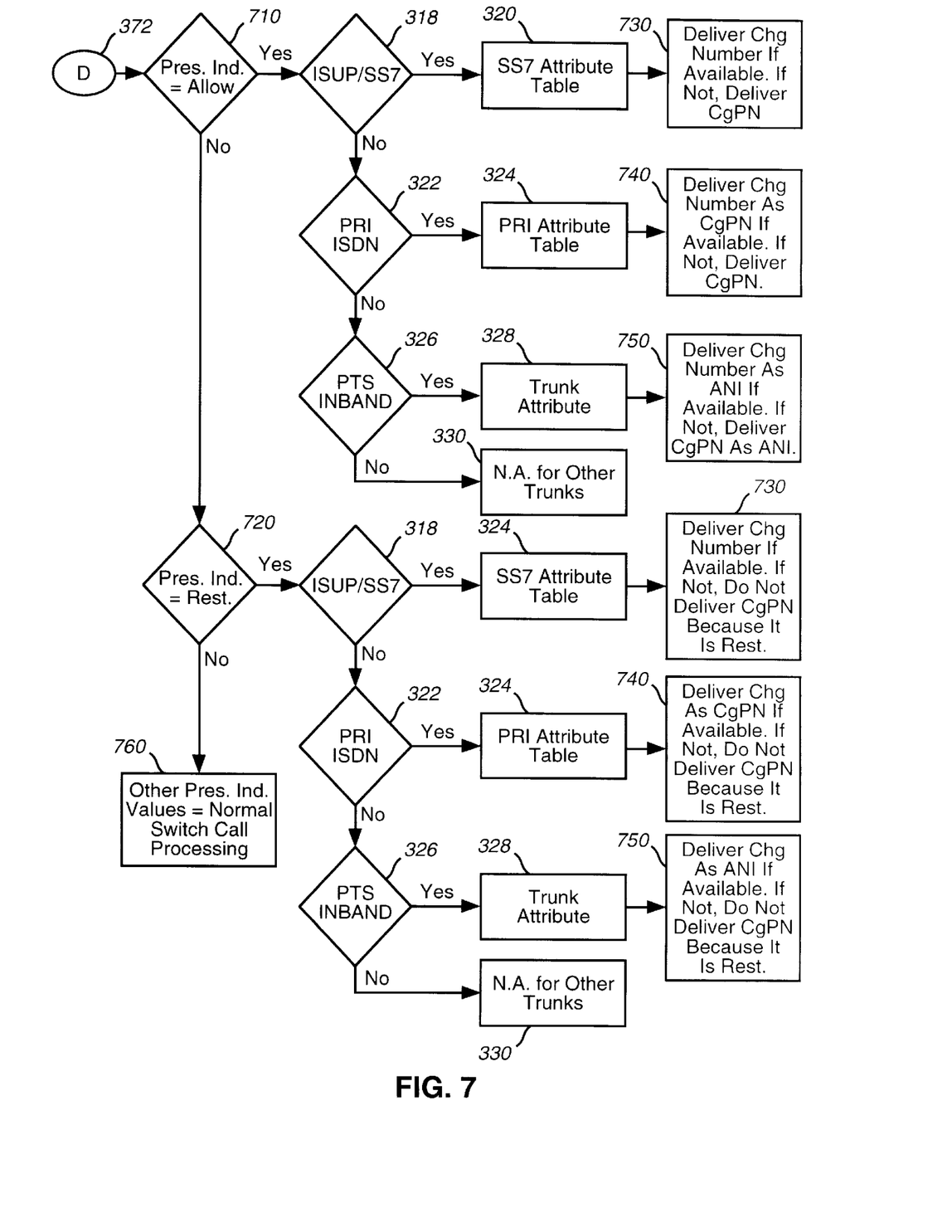
FIG. 7. is a flowchart representing the preferred operation of delivery option D of the present invention and is a continuation of FIG. 3.

The switch call processor 302, having determined at step 370 that delivery option D was selected by the receiving party 120 subscriber, proceeds to step 372. Referring to FIG. 7, step 372 passes control to step 710. Step 710 determines whether the originating party 102 set the PI to "Address Presentation Allowed." If so, step 318 determines if the termination trunk group is a SS7/ISUP type. If so, step 320 is performed to consult the SS7/ISUP attribute table to formulate an IAM with the Charge Number, if it is available, placed in the ChgN parameter. Else, if the ChgN is not available, the Calling Party Number will be included in the CgPN parameter. Then step 730 delivers the message to the destination switch 114 with either the ChgN parameter or the CgPN parameter, but never both. If the termination trunk group is not a SS7/ISUP type, step 322 determines if the destination switch 114 is a PRI/ISDN type. If so, step 324 is performed to consult the PRI/ISDN attribute table to formulate a SETUP message with the Charge Number, if it is available, placed in the CgPN parameter. Else, if the ChgN is not available, the Calling Party Number will be included in the CgPN parameter. Then step 740 delivers the message to the destination switch 114 with one of the parameters filled but never both. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the ChgN, if available, included. Else, if the ChgN is not available, the CgPN will be included. Then step 750 delivers the message as ANI information to the destination switch 114 with either the ChgN or CgPN but never both. If the termination trunk group is not a PTS/Inband type, step 330 simply completes the call because ANI delivery is not applicable for trunk group types other than ISUP/SS7, PRI/ISDN, or PTS/Inband types.

If step 710 determines the originating party 102 did not set the PI to "Address Presentation Allowed," step 720 determines if the PI is set to "Address Presentation Restricted." If so, switch call processor 302 again proceeds to step 318. Step 318 determines if the termination trunk group is a SS7/ISUP type. If so, step 320 is performed to consult the SS7/ISUP attribute table to formulate an IAM with the Charge Number, if it is available, placed in the ChgN parameter. Else, if the ChgN is not available, the Calling Party Number will not be included in the CgPN parameter. Then step 730 delivers the message to the destination switch 114. If the termination trunk group is not a SS7/ISUP type, step 322 determines if the destination switch 114 is a PRI/ISDN type. If so, step 324 is performed to consult the PRI/ISDN attribute table to formulate a SETUP message with the Charge Number, if it is available, placed in the CgPN parameter. Else, if the ChgN is not available, the Calling Party Number will not be included in the CgPN parameter. Then step 740 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the ChgN, if available, included. Else, if the ChgN is not available, the CgPN will not be included. Then step 750 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 720 determines the originating party 102 did not set the PI to "Address Presentation Restricted," the switch call processor 302, in step 760, will formulate an IAM to the destination switch 114 with the CgPN parameter as received from the origination switch 108 for a SS7/ISUP termination trunk group type; formulate a SETUP message to the destination switch 114 with the appropriate Data Elements for a PRI/ISDN termination trunk group type; or follow the appropriate protocol for the termination trunk group type and generate a message with the ChgN included for a PTS/Inband termination trunk group type.

Option E—"Conditional CgPN Delivery"

Figure 8:
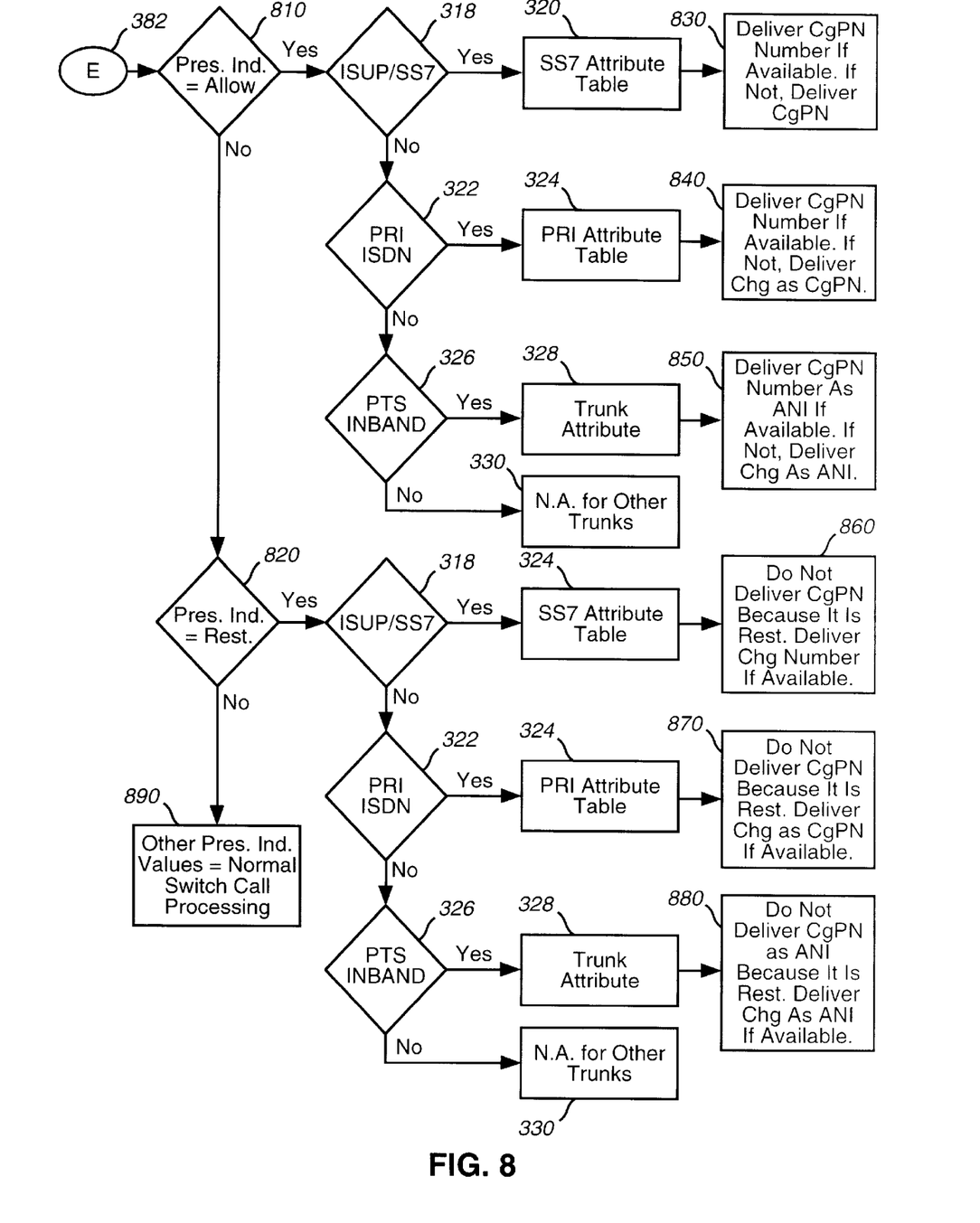
FIG. 8. is a flowchart representing the preferred operation of delivery option E of the present invention and is a continuation of FIG. 3.

The switch call processor 302, having determined at step 380 that delivery option E was selected by the receiving party 120 subscriber, proceeds to step 382. Referring to FIG. 8, step 382 passes control to step 810. Step 810 determines whether the originating party 102 set the PI to "Address Presentation Allowed." If so, step 318 determines if the termination trunk group is a SS7/ISUP type. If so, step 320 is performed to consult the SS7/ISUP attribute table to formulate an IAM with the Calling Party Number, if it is available, placed in the CgPN parameter. Else, if the CgPN is not available, the Charge Number will be included in the ChgN parameter. Then step 830 delivers the message to the destination switch 114 with either the CgPN parameter or the ChgN parameter, but never both. If the termination trunk group is not a SS7/ISUP type, step 322 determines if the destination switch 114 is a PRI/ISDN type. If so, step 324 is performed to consult the PRI/ISDN attribute table to formulate a SETUP message with the Calling Party Number, if it is available, placed in the CgPN parameter. Else, if the CgPN is not available, the ChgN will be included in the CgPN parameter. Then step 840 delivers the message to the destination switch 114 with either the CgPN or ChgN placed in the CgPN parameter, but never both. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the CgPN, if available, included. Else, if the CgPN is not available, the ChgN will be included. Then step 850 delivers the message as ANI information to the destination switch 114 with either the CgPN or ChgN but never both. If the termination trunk group is not a PTS/Inband type, step 330 simply completes the call because ANI delivery is not applicable for trunk group types other than ISUP/SS7, PRI/ISDN, or PTS/Inband types.

If step 810 determines the originating party 102 did not set the PI to "Address Presentation Allowed," step 820 determines if the PI is set to "Address Presentation Restricted." If so, switch call processor 302 again proceeds to step 318. Step 318 determines if the termination trunk group is a SS7/ISUP type. If so, step 320 is performed to consult the SS7/ISUP attribute table to formulate an IAM with the Charge Number, if it is available, placed in the ChgN parameter. Else, if the ChgN is not available, the Calling Party Number will not be included in the CgPN parameter. Then step 860 delivers the message to the destination switch 114. If the termination trunk group is not a SS7/ISUP type, step 322 determines if the destination switch 114 is a PRI/ISDN type. If so, step 324 is performed to consult the PRI/ISDN attribute table to formulate a SETUP message with the Charge Number, if it is available, placed in the CgPN parameter. Else, if the ChgN is not available, the Calling Party Number will not be included in the CgPN parameter. Then step 870 delivers the message to the destination switch 114. If the termination trunk group is not a PRI/ISDN type, step 326 determines if the termination trunk group is a PTS/Inband type. If so, step 328 is performed to consult the PTS/Inband attribute to formulate a message, following the appropriate protocol for that trunk group, to the destination switch 114 with the ChgN, if available, included. Else, if the ChgN is not available, the CgPN will not be included. Then step 880 delivers the message as ANI information to the destination switch 114. If the termination trunk group is not a PTS/Inband type, step 330 simply completes the call because ANI delivery is not applicable for trunk group types other than ISUP/SS7, PRI/ISDN, or PTS/Inband types.

If step 820 determines the originating party 102 did not set the PI to "Address Presentation Restricted," the switch call processor 302, in step 890, will formulate an IAM to the destination switch 114 with the CgPN parameter as received from the origination switch 108 for a SS7/ISUP termination trunk group type; formulate a SETUP message to the destination switch 114 with the appropriate Data Elements for a PRI/ISDN termination trunk group type; or follow the appropriate protocol for the termination trunk group type and generate a message with the ChgN included for a PTS/Inband termination trunk group type.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method of processing a telephone call from an originating switch to a destination switch, via an origination trunk group and a termination trunk group, comprising the steps of:

(1) receiving a presentation indicator, a charge number and a calling party number from the origination switch via the origination trunk group;

(2) checking a first attribute table associated with the termination trunk group to determine if mapping said charge number to said calling party number is required;

(3) screening a second attribute table for an automatic number identification (ANI) delivery option;

(4) screening said presentation indicator received from the origination trunk group;

(5) determining what group type the termination trunk group is;

(6) formulating a message containing ANI information for the destination switch based on the type of trunk group determined in step (5); and (7) transporting said message from the origination switch to the destination switch via the termination trunk group.

2. The method of claim 1, wherein step (3) comprises the step of:

(a) determining whether said ANI delivery option is set to one of the following:
(i) honor said presentation indicator;
(ii) deliver said calling party number;
(iii) prevent said calling party number delivery;
(iv) conditional said charge number delivery; and
(v) conditional said calling party number delivery.

3. The method of claim 2, wherein step (4) comprises the step of:

(a) determining whether said presentation indicator is set to one of the following:
   (i) address presentation restricted; and
   (ii) address presentation allowed.

4. The method of claim 3, wherein step (5) comprises the steps of:
   (a) determining whether said termination trunk group type is one of the following:
      (i) SS7/ISUP;
      (ii) ISDN/PRI; and
      (iii) PTS/Inband.

5. The method of claim 4, wherein step (6) comprises the steps of:
   (a) formulating said message with said calling party number included,
      if said presentation indicator is set to said address presentation allowed,
      said delivery option is set to said honor said presentation indicator or set to said deliver said calling party number, and
      said termination trunk group type is said SS7/ISUP type, said ISDN/PRI type, or said PTS/Inband type;
   (b) formulating said message without said calling party number included,
      if said presentation indicator is set to said address presentation allowed or set to said address presentation restricted,
      said delivery option is set to said prevent said calling party number delivery, and
      said termination trunk group type is said SS7/ISUP type or said PTS/Inband type;
   (c) formulating said message with said charge number, if available from the origination trunk,
      else with said calling party number, if available from the origination trunk, included,
      if said presentation indicator is set to said address presentation allowed, said delivery option is set to said conditional said charge number delivery, and
      said termination trunk group type is said SS7/ISUP type or said PTS/Inband type;
   (d) formulating said message with said calling party number, if available from the origination trunk,
      else with said charge number, if available from the origination trunk, included,
      if said presentation indicator is set to said address presentation allowed,
      said delivery option is set to said conditional said calling party number delivery, and
      said termination trunk group type is said SS7/ISUP type or said PTS/Inband type;
   (e) formulating said message with said calling party number included,
      if said presentation indicator is set to said address presentation restricted,
      said delivery option is set to said deliver said calling party number, and
      said termination trunk group type is said SS7/ISUP type, ISDN/PRI type, or said PTS/Inband type;
   (f) formulating said message with said charge number, if available from the origination trunk, included,
      if said presentation indicator is set to said address presentation restricted,
      said delivery option is set to said conditional said charge number delivery or set to said conditional calling party delivery, and
      said termination trunk group type is said SS7/ISUP type or PTS/Inband type;
   (g) formulating said message with said charge number, if available from the origination trunk, placed in said calling party number,
      else with said calling party number, if available from the origination trunk, included,
      if said presentation indicator is set to said address presentation allowed,
      said delivery option is set to said conditional said charge number delivery, and
      said termination trunk group type is said ISDN/PRI type;
   (h) formulating said message with said calling party number, if available from the origination trunk,
      else with said charge number, if available from the origination trunk, placed in said calling party number, included,
      if said presentation indicator is set to said address presentation allowed,
      said delivery option is set to said conditional said calling party number delivery, and
      said termination trunk group type is said ISDN/PRI type;
   (i) formulating said message without said calling party number included,
      if said presentation indicator is set to said address presentation restricted,
      said delivery option is set to said honor said presentation indicator, and
      said termination trunk group type is said ISDN/PRI type or said PTS/Inband type; and
   (j) formulating said message with said charge number, if available from the origination trunk, placed in said calling party number, included,
      if said presentation indicator is set to said address presentation restricted,
      said delivery option is set to said conditional said charge number delivery or set to said conditional calling party delivery, and
      said termination trunk group type is said ISDN/PRI type.

6. The method of claim 5, further comprising the step of:
   formulating said message with said calling party number included without the D1 to DM sub-fields,
   if said presentation indicator is set to said address presentation restricted,
   said delivery option is set to said honor said presentation indicator, and
   said termination trunk group type is said SS7/ISUP type.

7. A system of processing a telephone call from an originating switch to a destination switch, via an origination trunk group and a termination trunk group, comprising:
   first receiving means for receiving a presentation indicator, a charge number and a calling party number from the origination switch via the origination trunk group;
   second checking means for checking a first attribute table associated with the termination trunk group to determine if mapping said charge number to said calling party number is required;
   third screening means for screening a second attribute table for an automatic number identification (ANI) delivery option;
   fourth screening for screening said presentation indicator received from the origination trunk group;
   fifth determining means for determining what group type the termination trunk group is;

sixth formulating means for formulating a message containing ANI information for the destination switch based on the type of trunk group; and seventh transporting means for transporting said message from the origination switch to the destination switch via the termination trunk group.

8. The system of claim 7, wherein said means for screening the attribute table for an ANI delivery option comprise:

means for determining whether said delivery option is set to one of the following:
(i) honor said presentation indicator;
(ii) deliver said calling party number;
(iii) prevent said calling party number delivery;
(iv) conditional said charge number delivery; and
(v) conditional said calling party number delivery.

9. The system of claim 8, wherein said means for screening said presentation indicator received from the origination trunk group comprises:

means for determining whether said presentation indicator is set to one of the following:
(i) address presentation restricted; and
(ii) address presentation allowed.

10. The system of claim 9, wherein said means for determining what group type the termination trunk group is, comprises:

means for determining whether said termination trunk group type is one of the following:
(i) SS7/ISUP;
(ii) ISDN/PRI; and
(iii) PTS/Inband.

11. The system of claim 10, wherein said means for formulating said message comprises:

first formulating means for formulating said message with said calling party number included,
if said presentation indicator is set to said address presentation allowed,
said delivery option is set to said honor said presentation indicator or set to said deliver said calling party number, and
said termination trunk group type is said SS7/ISUP type, said ISDN/PRI type, or said PTS/Inband type;

second formulating means for formulating said message without said calling party number included,
if said presentation indicator is set to said address presentation allowed or set to said address presentation restricted,
said delivery option is set to said prevent said calling party number delivery, and
said termination trunk group type is said SS7/ISUP type or said PTS/Inband type;

third formulating means for formulating said message with said charge number, if available from the origination trunk,
else with said calling party number, if available from the origination trunk, included,
if said presentation indicator is set to said address presentation allowed,
said delivery option is set to said conditional said charge number delivery, and
said termination trunk group type is said SS7/ISUP type or said PTS/Inband type;

fourth formulating means for formulating said message with said calling party number, if available from the origination trunk,
else with said charge number, if available from the origination trunk, included,
if said presentation indicator is set to said address presentation allowed,
said delivery option is set to said conditional said calling party number delivery, and
said termination trunk group type is said SS7/ISUP type or said PTS/Inband type;

fifth formulating means for formulating said message with said calling party number included,
if said presentation indicator is set to said address presentation restricted,
said delivery option is set to said deliver said calling party number, and
said termination trunk group type is said SS7/ISUP type, ISDN/PRI type, or said PTS/Inband type;

sixth formulating means for formulating said message with said charge number, if available from the origination trunk, included,
if said presentation indicator is set to said address presentation restricted, said delivery option is set to said conditional said charge number delivery or set to said conditional calling party delivery,
and said termination trunk group type is said SS7/ISUP type or PTS/Inband type;

seventh formulating means for formulating said message with said charge number, if available from the origination trunk, placed in said calling party number,
else with said calling party number, if available from the origination trunk, included,
if said presentation indicator is set to said address presentation allowed,
said delivery option is set to said conditional said charge number delivery,
and said termination trunk group type is said ISDN/PRI type;

eighth formulating means for formulating said message with said calling party number, if available from the origination trunk,
else with said charge number, if available from the origination trunk, placed in said calling party number, included,
if said presentation indicator is set to said address presentation allowed, said delivery option is set to said conditional said calling party number delivery, and
said termination trunk group type is said ISDN/PRI type;

ninth formulating means for formulating said message without said calling party number included,
if said presentation indicator is set to said address presentation restricted,
said delivery option is set to said honor said presentation indicator, and
said termination trunk group type is said ISDN/PRI type or said PTS/Inband type; and tenth formulating means for formulating said message with said charge number, if available from the origination trunk, placed in said calling party number, included,
if said presentation indicator is set to said address presentation restricted,
said delivery option is set to said conditional said charge number delivery or set to said conditional calling party delivery, and
said termination trunk group type is said ISDN/PRI type.

12. The system of claim 11, wherein said means for formulating said message further comprises:

eleventh formulating means for formulating said message with said calling party number included without the D1 to DM sub-fields,
if said presentation indicator is set to said address presentation restricted,
said delivery option is set to said honor said presentation indicator, and
said termination trunk group type is said SS7/ISUP type.

13. A computer program product for use with a computer comprising:
first computer readable program code means for enabling a processor to receive a presentation indicator, a charge number and a calling party number from the origination switch via the origination trunk group;
second computer readable program code means for enabling said processor to check a first attribute table associated with the termination trunk group to determine if mapping said charge number to said calling party number is required;
third computer readable program code means for screening a second attribute table for an automatic number identification (ANI) delivery option;
fourth computer readable program code for enabling said processor to screen said presentation indicator received from the origination trunk group;
fifth computer readable program code means for enabling said processor to determine what group type the termination trunk group is;
sixth computer readable program code means for enabling said processor to formulate a message containing ANI information for the destination switch based on the type of trunk group; and
seventh computer readable program code means for enabling said processor to transport said message from the origination switch to the destination switch via the termination trunk group.

14. A computer program product according to claim 13, wherein said computer readable program code means for enabling said processor to screen the attribute table for said ANI delivery option comprising:
computer readable program code means for enabling said processor to determine whether said ANI delivery option is set to one of the following:
(i) honor said presentation indicator;
(ii) deliver said calling party number;
(iii) prevent said calling party number delivery;
(iv) conditional said charge number delivery; and
(v) conditional said calling party number delivery.

15. A computer program product according to claim 14, wherein said computer readable program code means for enabling said processor to screen said presentation indicator received from the origination trunk group comprises:
computer readable program code means for enabling said processor to determine whether said presentation indicator is set to one of the following:
(i) address presentation restricted; and
(ii) address presentation allowed.

16. A computer program product according to claim 15, wherein said computer readable program code means for enabling said processor to determine what group type the termination trunk group is, comprises:
computer readable program code means for enabling said processor to determine whether said termination trunk group type is one of the following:

(i) SS7/ISUP;
(ii) ISDN/PRI; and
(iii) PTS/Inband.

17. A computer program product according to claim 16, wherein said computer readable program code means for enabling said processor to formulate said message comprises:
first computer readable program code means for enabling said processor to formulate said message with said calling party number included,
if said presentation indicator is set to said address presentation allowed,
said delivery option is set to said honor said presentation indicator or set to said deliver said calling party number, and
said termination trunk group type is said SS7/ISUP type, said ISDN/PRI type, or said PTS/Inband type;
second computer readable program code means for enabling said processor to formulate said message without said calling party number included,
if said presentation indicator is set to said address presentation allowed or set to said address presentation restricted,
said delivery option is set to said prevent said calling party number delivery, and
said termination trunk group type is said SS7/ISUP type or said PTS/Inband type;
third computer readable program code means for enabling said processor to formulate said message with said charge number, if available from the origination trunk, else with said calling party number, if available from the origination trunk, included,
if said presentation indicator is set to said address presentation allowed, said delivery option is set to said conditional said charge number delivery,
and said termination trunk group type is said SS7/ISUP type or said PTS/Inband type;
fourth computer readable program code means for enabling said processor to formulate said message with said calling party number, if available from the origination trunk,
else with said charge number, if available from the origination trunk, included,
if said presentation indicator is set to said address presentation allowed, said delivery option is set to said conditional said calling party number delivery, and
said termination trunk group type is said SS7/ISUP type or said PTS/Inband type;
fifth computer readable program code means for enabling said processor to formulate said message with said calling party number included,
if said presentation indicator is set to said address presentation restricted,
said delivery option is set to said deliver said calling party number, and
said termination trunk group type is said SS7/ISUP type, ISDN/PRI type, or said PTS/Inband type;
sixth computer readable program code means for enabling said processor to formulate said message with said charge number, if available from the origination trunk, included,
if said presentation indicator is set to said address presentation restricted,
said delivery option is set to said conditional said charge number delivery or set to said conditional calling party delivery, and said termination trunk group type is said SS7/ISUP type or PTS/Inband type;

seventh computer readable program code means for enabling said processor to formulate said message with said charge number, if available from the origination trunk, placed in said calling party number,
else with said calling party number, if available from the origination trunk, included,
if said presentation indicator is set to said address presentation allowed,
said delivery option is set to said conditional said charge number delivery, and
said termination trunk group type is said ISDN/PRI type;

eighth computer readable program code means for enabling said processor to formulate said message with said calling party number, if available from the origination trunk,
else with said charge number, if available from the origination trunk, placed in said calling party number, included,
if said presentation indicator is set to said address presentation allowed,
said delivery option is set to said conditional said calling party number delivery, and
said termination trunk group type is said ISDN/PRI type;

ninth computer readable program code means for enabling said processor to formulate said message without said calling party number included,
if said presentation indicator is set to said address presentation restricted,
said delivery option is set to said honor said presentation indicator, and
said termination trunk group type is said ISDN/PRI type or said PTS/Inband type; and tenth computer readable program code means for enabling said processor to formulate said message with said charge number, if available from the origination trunk, placed in said calling party number, included,
if said presentation indicator is set to said address presentation restricted,
said delivery option is set to said conditional said charge number delivery or set to said conditional calling party delivery, and
said termination trunk group type is said ISDN/PRI type.

18. The computer program product of claim 17, wherein said computer readable program code means for enabling said processor to formulate said message further comprises:

eleventh computer readable program code means for enabling said processor to formulate said message with said calling party number included without the D1 to DM sub-fields,
if said presentation indicator is set to said address presentation restricted,
said delivery option is set to said honor said presentation indicator, and
said termination trunk group type is said SS7/ISUP type.

* * * * *